(12) United States Patent
Demers et al.

(10) Patent No.: US 6,402,471 B1
(45) Date of Patent: Jun. 11, 2002

(54) TURBINE BLADE FOR GAS TURBINE ENGINE AND METHOD OF COOLING SAME

(75) Inventors: Daniel Edward Demers, Ipswich; Robert Francis Manning; Paul Joseph Acquaviva, both of Newburyport, all of MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/706,387

(22) Filed: Nov. 3, 2000

(51) Int. Cl.[7] .................................................. F01D 5/18
(52) U.S. Cl. ............... 416/97 R; 416/96 R; 416/193 A; 415/115
(58) Field of Search .......................... 416/92, 95, 96 R, 416/97 R, 96 A, 97 A, 193 A; 415/115, 116

(56) References Cited

U.S. PATENT DOCUMENTS

| | | | |
|---|---|---|---|
| 3,791,758 A | 2/1974 | Jenkinson | 415/116 |
| 4,910,958 A * | 3/1990 | Kreitmeier | 416/95 |
| 5,197,852 A * | 3/1993 | Walker et al. | 416/115 |
| 5,609,466 A * | 3/1997 | North et al. | 415/115 |
| 5,738,489 A | 4/1998 | Lee | 415/177 |
| 6,071,075 A * | 6/2000 | Tomita et al. | 416/97 R |
| 6,079,946 A * | 6/2000 | Suenaga et al. | 416/97 R |

FOREIGN PATENT DOCUMENTS

JP 402011801 A * 1/1990 ............... 416/97 R

* cited by examiner

Primary Examiner—Edward K. Look
Assistant Examiner—Richard Woo
(74) Attorney, Agent, or Firm—William Scott Andes Pierce Atwood

(57) ABSTRACT

A turbine blade includes a platform having an internal cavity formed therein and an airfoil extending radially from the platform. An internal cooling circuit is formed in the airfoil for circulating a coolant therethrough, and at least one supply passage extends between the internal cooling circuit and the internal platform cavity for diverting coolant to the internal platform cavity. The coolant is expelled from holes located in the forward and aft edges of the platform for purging the forward and aft disk wheel spaces and impingement cooling adjacent nozzle bands.

20 Claims, 7 Drawing Sheets

TURBINE BLADE FOR GAS TURBINE ENGINE AND METHOD OF COOLING SAME

BACKGROUND OF THE INVENTION

The present invention relates generally to gas turbine engines, and more particularly to internally cooled turbine rotor blades used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

The turbine rotor comprises a row of rotor blades mounted to the perimeter of a rotor disk that rotates about the centerline axis of the engine. Each rotor blade typically includes a shank portion having a dovetail for mounting the blade to the rotor disk and an airfoil that extracts useful work from the hot gases exiting the combustor. A blade platform, formed at the junction of the airfoil and the shank portion, defines the radially inner boundary for the hot gas stream. The turbine nozzles are usually segmented around the circumference thereof to accommodate thermal expansion. Each nozzle segment has one or more nozzle vanes disposed between inner and outer bands for channeling the hot gas stream into the turbine rotor in such a manner that the turbine rotor can do work.

The high pressure turbine components are exposed to extremely high temperature combustion gases. Thus, the turbine blades, nozzle vanes and inner and outer bands typically employ internal cooling to keep their temperatures within certain design limits. The airfoil of a turbine rotor blade, for example, is ordinarily cooled by passing cooling air through an internal circuit. The cooling air normally enters through a passage in the blade's root and exits through film cooling holes formed in the airfoil surface, thereby producing a thin layer or film of cooling air that protects the airfoil from the hot gases. Known turbine blade cooling circuits often include a plurality of radially oriented passages that are series-connected to produce a serpentine path, thereby increasing cooling effectiveness by extending the length of the coolant flow path.

Similarly, various conventional configurations exist for cooling the nozzle vanes and bands. The most common types of cooling include impingement and film cooling. To effect impingement cooling, the vane airfoil includes one or more perforated hollow inserts that are suitably mounted therein. Cooling air is channeled into the inserts and then impinges against the inner surface of the airfoil for impingement cooling thereof. Film cooling is accomplished by passing the cooling air through film cooling holes formed in the vane airfoil so as to produce a thin layer of cooling air on the outer surface of the vane.

The spaces fore and aft of the rotor disks, commonly referred to as the disk wheel spaces, are in fluid communication with the hot gas stream. Thus, the rotor disks are also subjected to high temperatures, particularly at the disk rim. To prevent overheating of the rotor disks, cooling air is used to purge the fore and aft disk wheel spaces, thereby limiting the ingestion of hot gases.

The cooling air for each of these cooling applications is usually extracted from the compressor. Because the extracted air leads to an associated thermodynamic loss to the engine cycle, it is desirable to keep the amount of air diverted for cooling to a minimum. However, advanced engine designs with increased thrust-to-weight ratios operate at higher turbine inlet temperatures. The higher temperatures require greater overall turbine cooling and make it necessary to cool the blade platform as well. Accordingly, there is a need for improved cooling of turbine components, including the blade platform, without increasing chargeable cooling flow.

SUMMARY OF THE INVENTION

The above-mentioned need is met by the present invention which provides a turbine blade including a platform having an internal cavity formed therein and an airfoil extending radially from the platform. An internal cooling circuit is formed in the airfoil for circulating a coolant therethrough, and at least one supply passage extends between the internal cooling circuit and the internal platform cavity for diverting coolant to the internal platform cavity.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
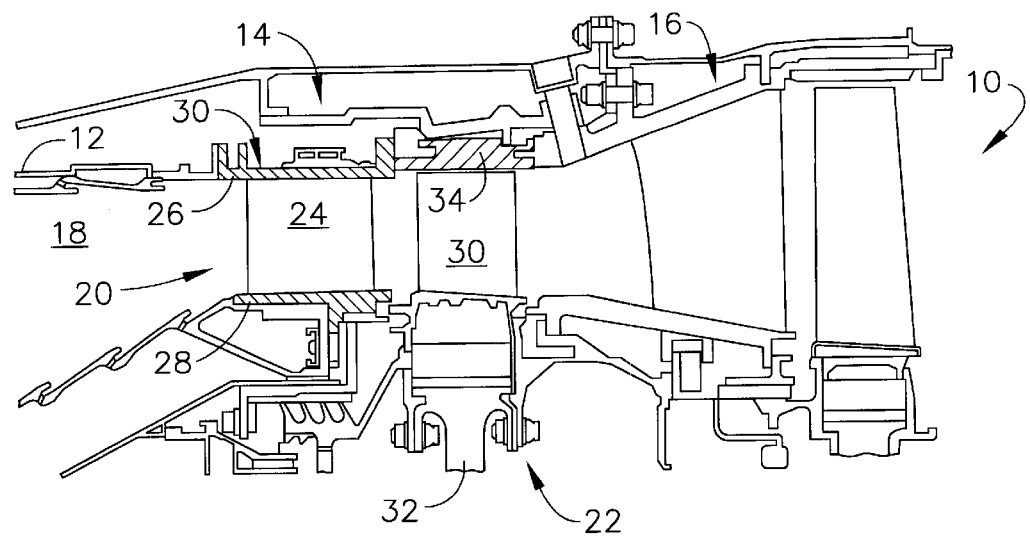
FIG. 1 is a partial cross-sectional view of a gas turbine engine having the turbine blades of the present invention.

Referring to the drawings wherein identical reference numerals denote the same elements throughout the various views, FIG. 1 shows a portion of a gas turbine engine 10 having, among other structures, a combustor 12, a high pressure turbine 14, and a low pressure turbine 16. The combustor 12 includes a generally annular hollow body defining a combustion chamber 18 therein. A compressor (not shown) provides compressed air that passes primarily into the combustor 12 to support combustion and partially around the combustor 12 where it is used to cool both the combustor liners and turbomachinery further downstream. Fuel is introduced into the forward end of the combustor 12 and is mixed with the air in a conventional fashion. The resulting fuel-air mixture flows into the combustion chamber 18 where it is ignited for generating hot combustion gases. The hot combustion gases are discharged to the high pressure turbine 14 located downstream of the combustor 12 where they are expanded so that energy is extracted. The hot gases then flow to the low pressure turbine 16 where they are expanded further.

The high pressure turbine 14 includes a turbine nozzle 20 and a turbine rotor 22. The turbine nozzle 20 includes a plurality of circumferentially spaced vanes 24 (only one shown in FIG. 1) that are supported between a number of arcuate outer bands 26 and arcuate inner bands 28. The vanes 24, outer bands 26 and inner bands 28 are arranged into a plurality of circumferentially adjoining nozzle segments that collectively form a complete 360° assembly. The outer and inner bands 26 and 28 of each nozzle segment define the outer and inner radial flowpath boundaries, respectively, for the hot gas stream flowing through the nozzle 20. The vanes 24 are configured so as to optimally direct the combustion gases to the turbine rotor 22.

The turbine rotor 22 includes a plurality of circumferentially spaced apart blades 30 (only one shown in FIG. 1) extending radially outwardly from a rotor disk 32 that rotates about the centerline axis of the engine 10. A plurality of arcuate shrouds 34 is arranged circumferentially in an annular array so as to closely surround the rotor blades 30 and thereby define the outer radial flowpath boundary for the hot gas stream flowing through the turbine rotor 22.

Figure 2:
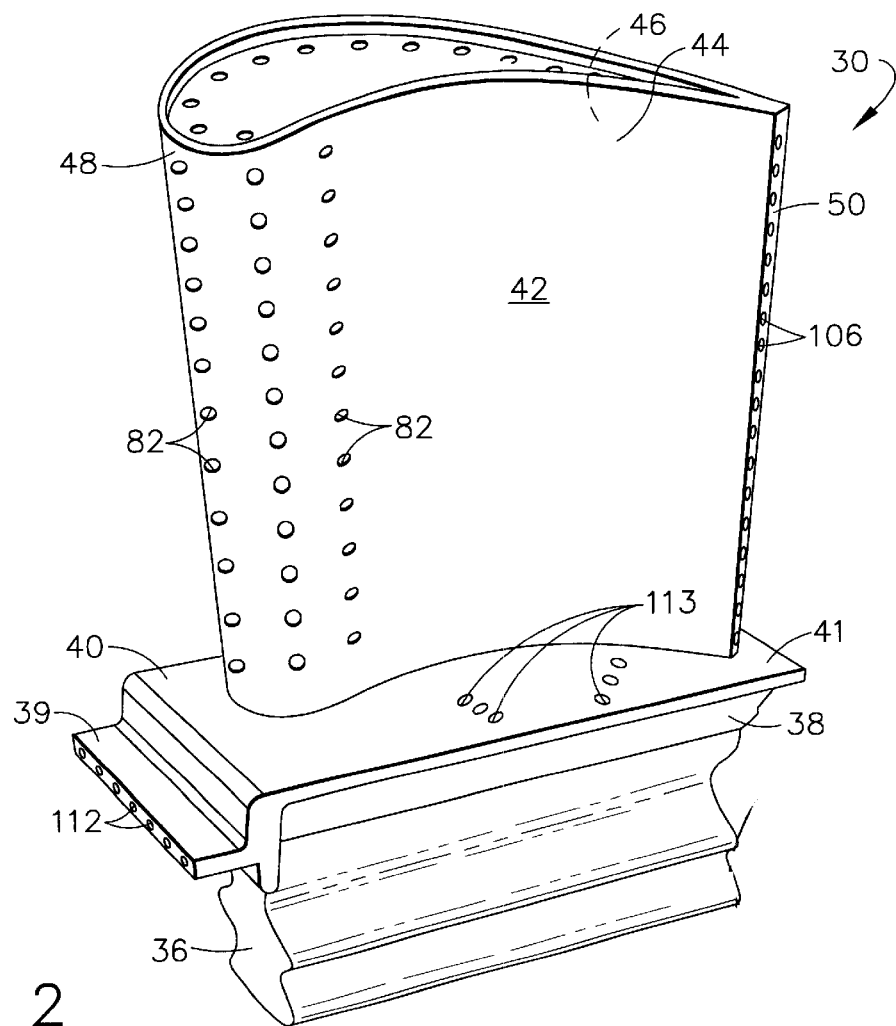
FIG. 2 is a perspective view of a turbine blade having the cooling configuration of the present invention.

An exemplary one of the turbine rotor blades 30 is illustrated in FIG. 2 and includes a conventional dovetail 36, which may have any suitable form including tangs that engage complementary tangs of a dovetail slot in the rotor disk 32 for radially retaining the blade 30 to the disk 32 as it rotates during operation. A blade shank 38 extends radially upwardly from the dovetail 36 and terminates in a platform 40 that projects laterally outwardly from and surrounds the shank 38. The platform 40 includes a forward angel wing 39 and an aft angel wing 41. The platforms 40 of adjacent blades 30 abut one another to form a radially inner boundary for the hot gas stream.

A hollow airfoil 42 extends radially outwardly from the platform 40 and into the hot gas stream. The airfoil 42 has a concave pressure side 44 and a convex suction side 46 joined together at a leading edge 48 and at a trailing edge 50. The airfoil 42 may take any configuration suitable for extracting energy from the hot gas stream and causing rotation of the rotor disk 32. The blade 30 is preferably formed as a one-piece casting of a suitable superalloy, such as a nickel-based superalloy, which has acceptable strength at the elevated temperatures of operation in the gas turbine engine 10.

Figure 3:
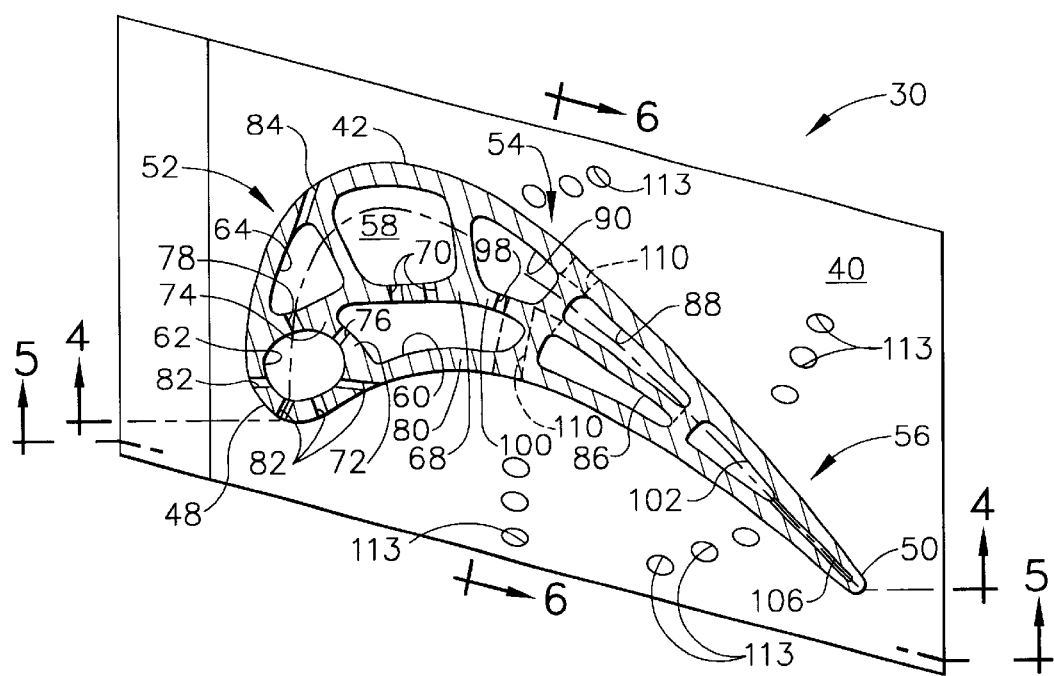
FIG. 3 is a cross-sectional view of the turbine blade of FIG. 2 taken through the airfoil.
Figure 4:
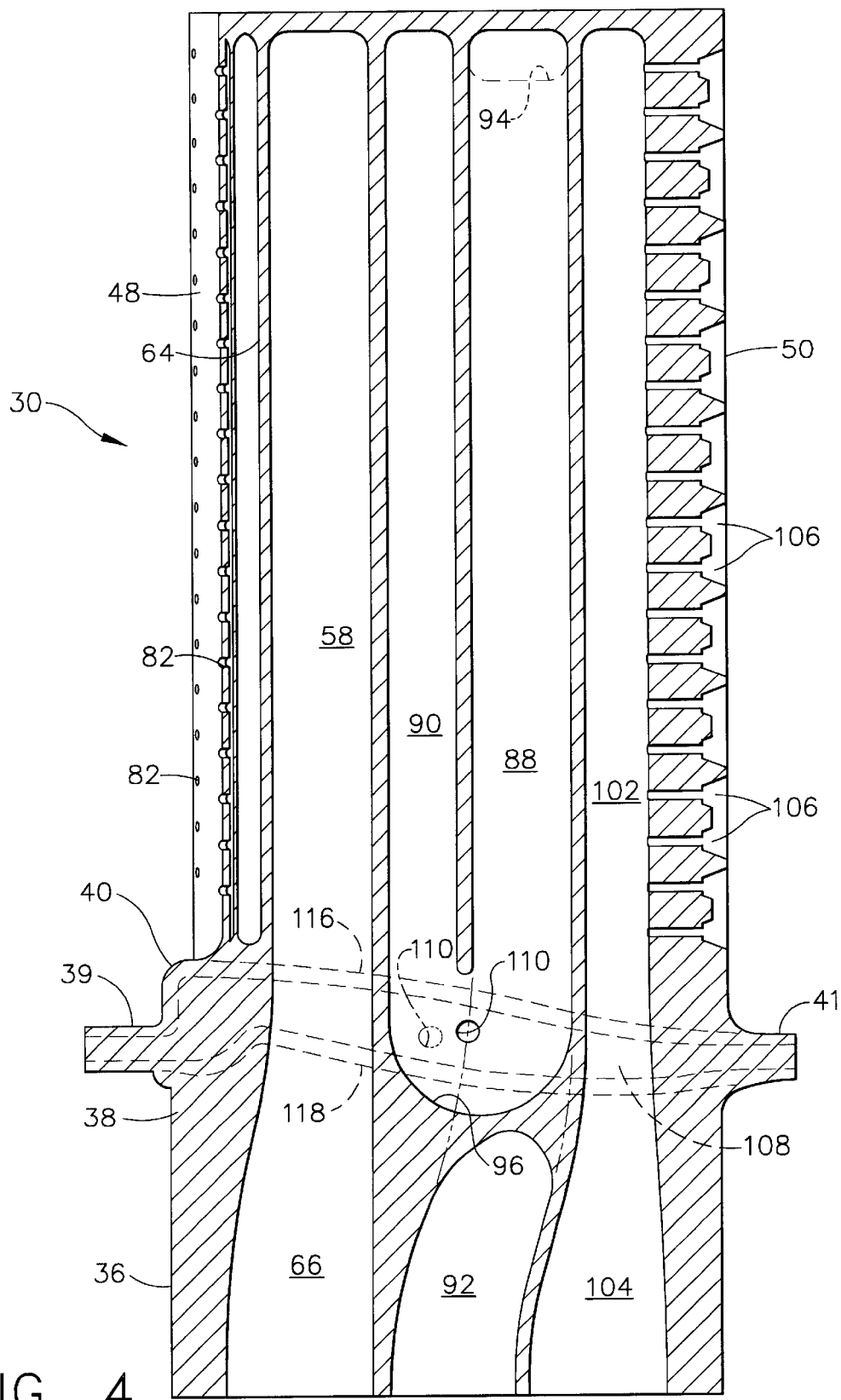
FIG. 4 is a cross-sectional view of the turbine blade taken along line 4—4 of FIG. 3.

Turning now to FIGS. 3 and 4, it is seen that the blade 30 has an internal cooling configuration that includes a leading edge circuit 52, a mid-chord circuit 54, and a trailing edge circuit 56. The leading edge circuit 52 includes first, second, third and fourth radially extending cavities 58, 60, 62 and 64, respectively, formed in the airfoil 42. The leading edge circuit 52 further includes a first inlet passage 66 formed through the dovetail 36 and the shank 38. The first inlet passage 66 is in fluid communication with the first cavity 58. The first and second cavities 58 and 60 are separated by a first rib 68, which has a first plurality of cross-over holes 70 formed therein. The third cavity 62 (which is located adjacent to the leading edge 48) is separated from the second cavity 60 by a second rib 72, and the fourth cavity 64 is separated from the third cavity 62 by a third rib 74. A second plurality of cross-over holes 76 is formed in the second rib 72, and a third plurality of cross-over holes 78 is formed in the third rib 74.

The first cavity 58 receives a coolant (usually a portion of the relatively cool compressed air bled from the compressor) through the first inlet passage 66, and the coolant travels radially outwardly through the first cavity 58. As best seen in FIG. 3, the coolant passes into the second cavity 60 through the first cross-over holes 70 and impinges on the inner surface of the pressure side airfoil wall 80 for cooling thereof. The coolant then passes through the second cross-over holes 76 into the third cavity 62. Some of the coolant in the third cavity 62 passes into the fourth cavity 64 through the third cross-over holes 78 and the remaining coolant exits the third cavity 62, and the airfoil 42, through a number of film cooling holes 82 that are in fluid communication with the third cavity 62. The coolant in the fourth cavity 64 exits the airfoil 42 through additional film cooling holes 84 that are in fluid communication with the fourth cavity 64.

The mid-chord circuit 54 includes fifth, sixth and seventh radially extending cavities 86, 88 and 90, respectively, that are fluidly connected in series in a serpentine arrangement. The fifth cavity 86 receives coolant from a second inlet passage 92 formed through the dovetail 36 and the shank 38. The coolant travels radially outwardly through the fifth cavity 86, passes into the sixth cavity 88 at an outer turn 94 and then flows radially inwardly through the sixth cavity 88. From there, a portion of the coolant passes into the seventh cavity 90 at an inner turn 96 and again flows radially outwardly. The coolant in the seventh cavity 90 passes into the second cavity 60 through a fourth plurality of cross-over holes 98 that are formed in a fourth rib 100, which separates the second cavity 60 and the seventh cavity 90. The coolant passing through the fourth crossover holes 98 also impinges on the inner surface of the pressure side airfoil wall 80 for additional cooling thereof.

The trailing edge circuit 56 includes an eighth radially extending cavity 102 that receives coolant from a third inlet passage 104 formed through the dovetail 36 and the shank 38. This coolant travels radially outwardly through the eighth cavity 102 and exits the airfoil 42 through trailing edge slots 106 that extend from the eighth cavity 102 to the trailing edge 50.

The blade's internal cooling configuration, as described thus far, is being used as an example to facilitate disclosure of the present invention. However, it will be apparent from the subsequent description that the inventive concept of the present invention is not limited to turbine blades having the three cooling circuits 52, 54, 56 described above. Indeed, the present invention is applicable to a wide variety of cooling configurations.

Figure 6:
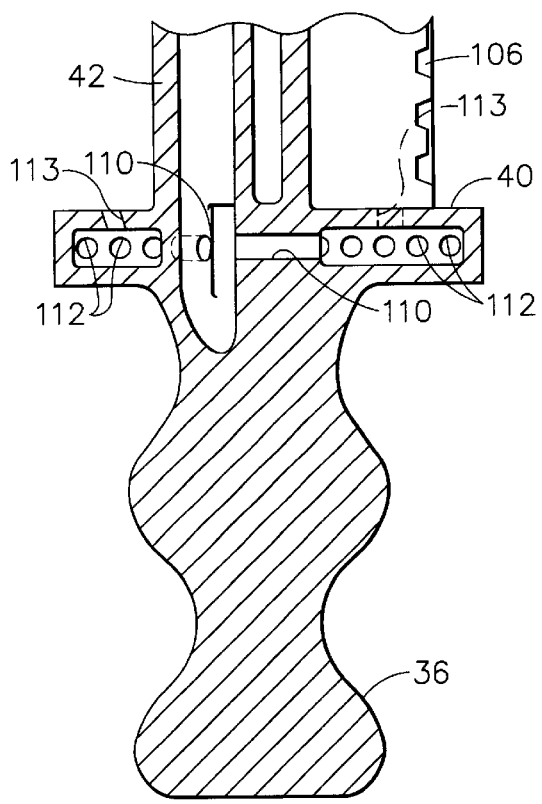
FIG. 6 is a cross-sectional view of the turbine blade taken along line 6—6 of FIG. 3.
Figure 5:
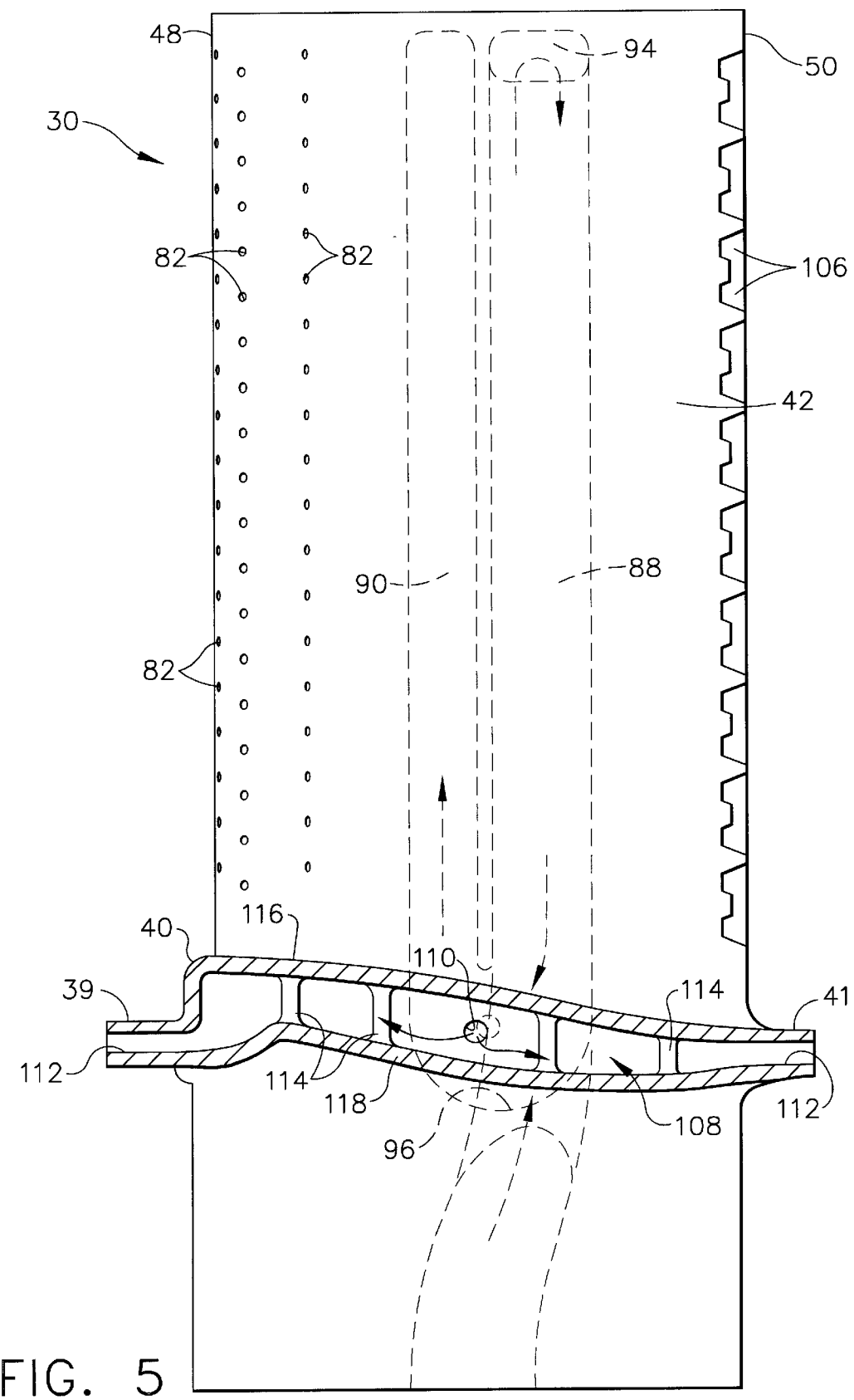
FIG. 5 is a cross-sectional view of the turbine blade taken along line 5—5 of FIG. 3.

Referring also to FIGS. 5 and 6, it is seen that the present invention cools the platform 40 as well as the airfoil 42. Specifically, the platform 40 is hollow so as to define an internal cooling cavity 108 therein. The platform cavity 108 extends substantially the entire axial length (i.e., from the forward angel wing 39 to the aft angel wing 41) of the platform 40 as well as substantially the entire circumferential width of the platform 40. Coolant is delivered to the platform cavity 108 via two supply passages 110 that extend between the platform cavity 108 and the inner turn 96 of the mid-chord circuit 54. Thus, some of the coolant passing from the sixth cavity 88 to the seventh cavity 90 is diverted into the platform cavity 108 through the supply passages 110. The two supply passages 110 extend substantially laterally from respective sides of the mid-chord circuit 54 so as to supply coolant to both sides of the platform cavity 108.

Figure 7:
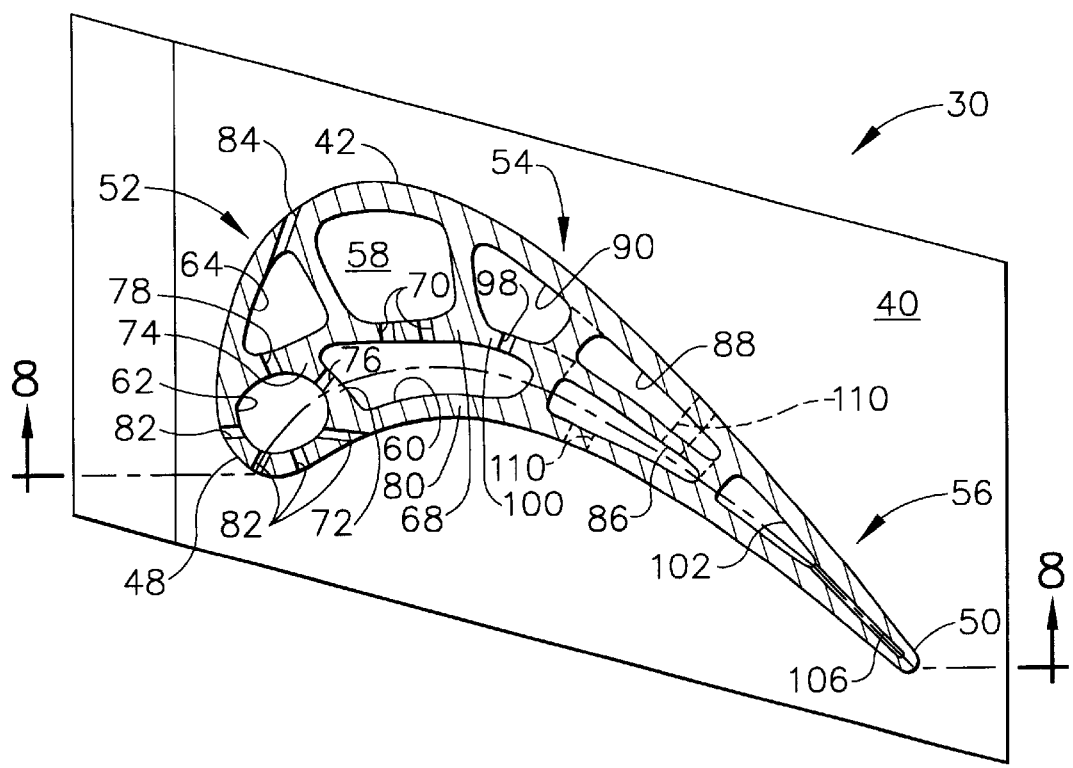
FIG. 7 is a cross-sectional view taken through the airfoil of an alternative embodiment of a turbine blade.
Figure 8:
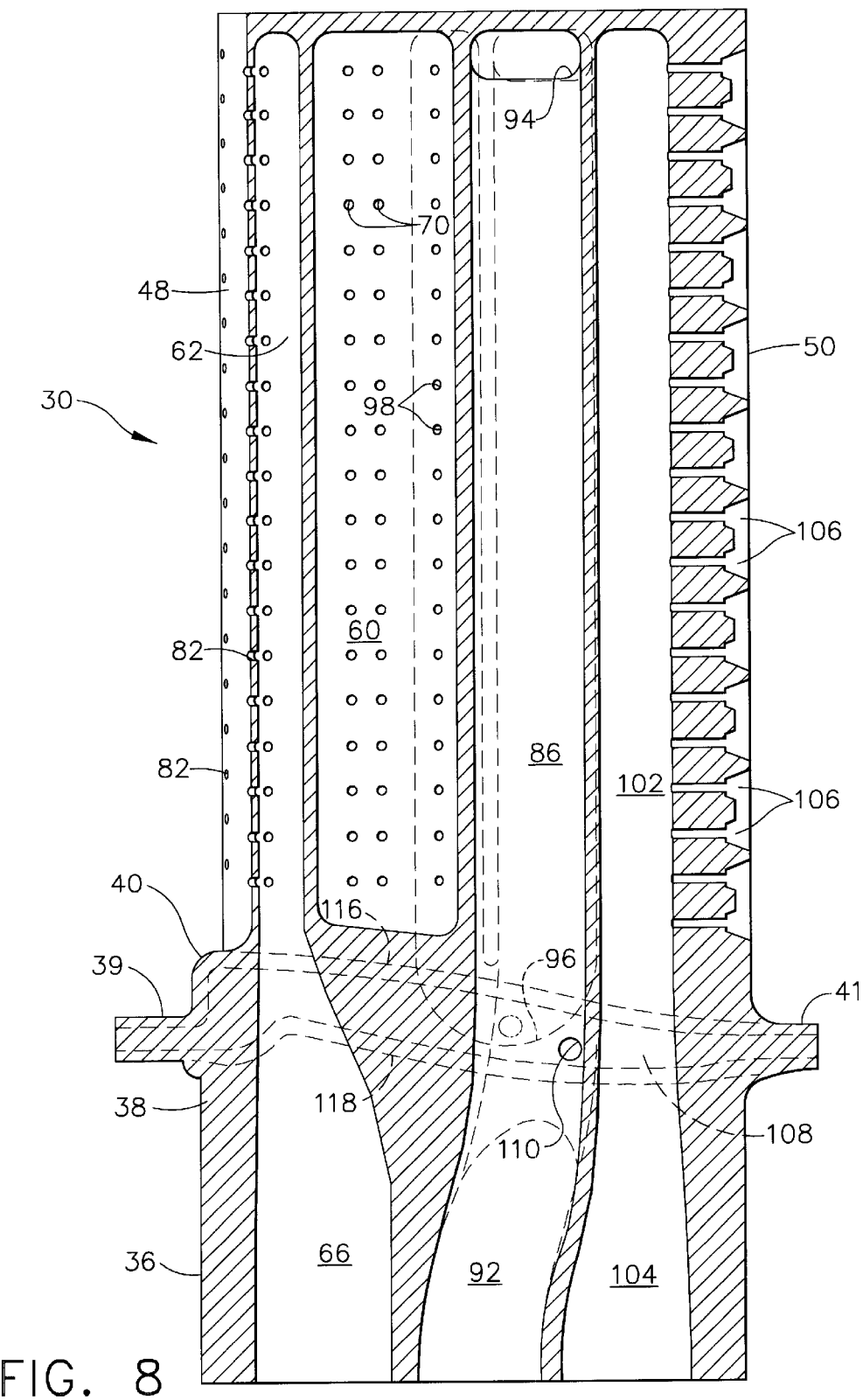
FIG. 8 is a cross-sectional view of the turbine blade taken along line 8—8 of FIG. 7.

An alternative embodiment of the blade 30 is shown in FIGS. 7 and 8. In this case, the supply passages 110 extend between the platform cavity 108 and the fifth cavity 86. The passages 110 connect to the fifth cavity 86 at or near its intersection with the second inlet passage 92, which intersection is the inlet of the mid-chord circuit 54. Thus, some of the coolant entering into the fifth cavity 86 is diverted into the platform cavity 108 through the supply passages 110. This arrangement differs from the aforementioned embodiment of FIGS. 5 and 6 in that fresh coolant is delivered to the platform cavity 108 rather than coolant that has been used in cooling the airfoil 42. As in the first embodiment, the two supply passages 110 extend substantially laterally from respective sides of the mid-chord circuit 54 so as to supply coolant to both sides of the platform cavity 108. Other possible alternatives include supply passages that feed coolant from the leading edge circuit 52 and/or the trailing edge circuit 56.

A plurality of discrete outlet holes 112 is formed in the distal edge of each of the platform angel wings 39 and 41 so as to provide fore and aft egress for the coolant from the platform cavity 108. Thus, the platform 40 is cooled by coolant entering the platform cavity 108 at the supply passages 110, flowing forward and aft through the platform cavity 108, and exiting the platform 40 via the outlet holes 112. Preferably, the outlet holes 112 are angled away from the direction of rotation of the rotor disk 32. This way, the stream of coolant exiting the outlet holes 112 will add some momentum to the turbine rotor 22. In addition, film cooling holes 113 are formed in the radially outer surface of the platform 40 (i.e., the platform surface facing the hot gas stream). The film cooling holes 113 are generally located at locations on the platform 40 requiring film cooling and are slanted with respect to the outer platform surface so that coolant from the platform cavity 108 passing through the holes 113 will form a thin cooling film on the outer platform surface. It should be noted that, depending on the requirements of a particular application, the blade 30 can be provided with both the outlet holes 112 and the film cooling holes 113 (as shown in the FIG.), just outlet holes 112, or just film cooling holes 113.

Convective cooling enhancement features can be provided in the platform cavity 108 to enhance cooling and reduce the amount of coolant flow needed to cool the platform 40. For example, FIG. 5 shows an array of radially extending pins 114, commonly referred to as a pin bank, disposed in the platform cavity 108. The pins 114 are axially and laterally spaced throughout the platform cavity 108, and each pin 114 extends from the radially outer wall 116 of the platform 40 to the radially inner wall 118. Other convective cooling enhancement features such as turbulators or the like could be used as an alternative to the pin bank, but it is noted that by extending between the platform walls 116 and 118, the pins 114 provide structural support to the hollow platform 40.

Figure 9:
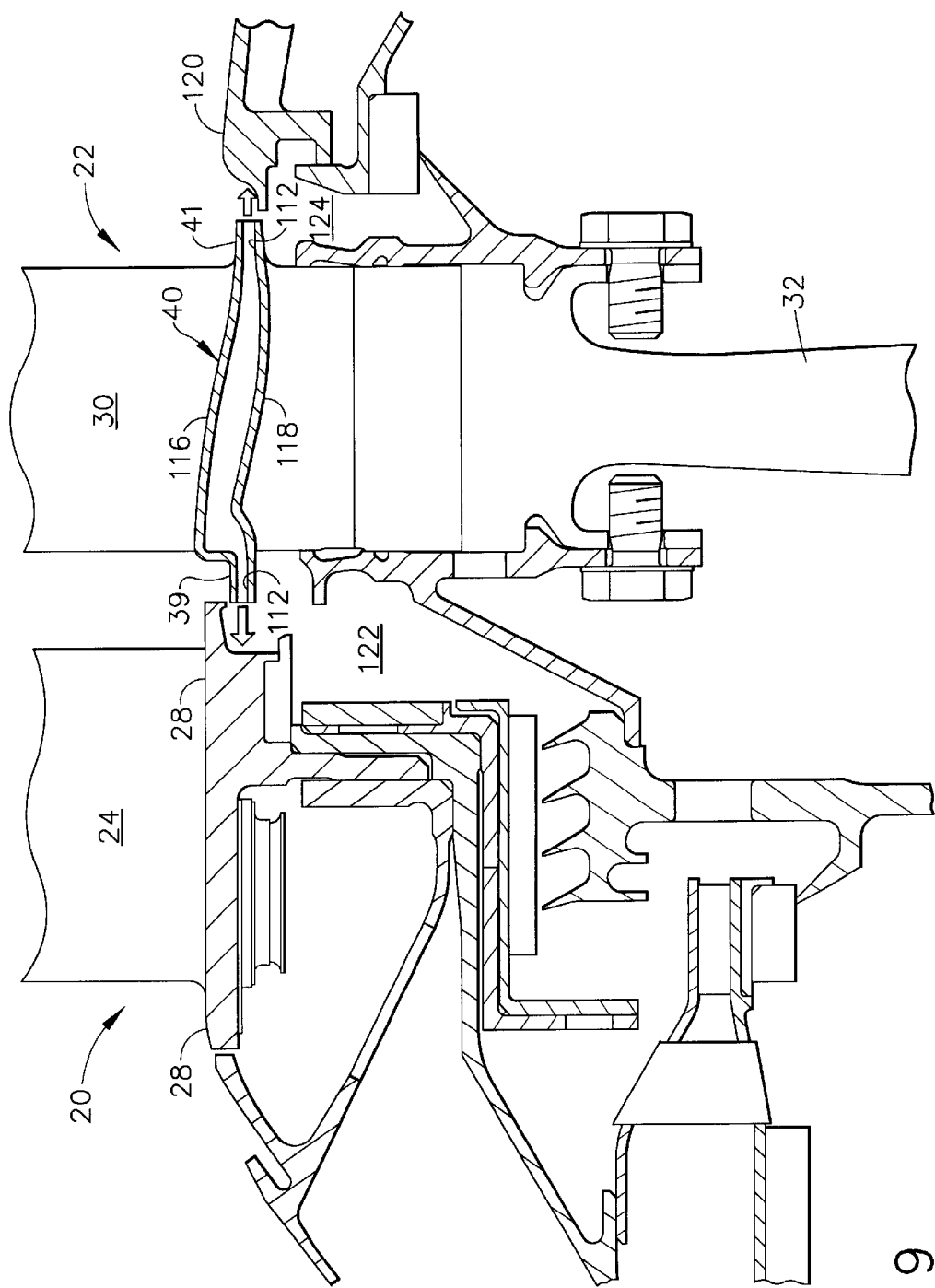
FIG. 9 is an enlarged cross-sectional view of a gas turbine engine showing the turbine blade of the present invention and adjacent structure.

The present invention provides other benefits in addition to cooling the platform 40. As seen in FIG. 9, the coolant is expelled from the platform 40 through the outlet holes 112 in the forward angel wing 39 in a series of coolant jets. Because the forward angel wing 39 is radially aligned with inner band 28 the turbine nozzle 20, the coolant jets impinge on the inner band 28. Thus, positive impingement cooling of the aft end of the inner band 28, which has traditionally been a challenging region to cool, is achieved. Similarly, jets of coolant expelled from the platform 40 through the outlet holes 112 in the aft angel wing 41 provide impingement cooling of the second stage or low pressure turbine nozzle inner band 120. In addition, the coolant jets, both forward and aft of the turbine rotor 22, act as a blockage or "jet dam" that prevents, or at least reduces, the ingestion of hot gases into the forward and aft disk wheel spaces 122 and 124. Lastly, the expelling of coolant into the forward and aft disk wheel spaces 122 and 124 supplements the purging of these spaces, thereby reducing the amount of purge air that would be otherwise required for this purpose.

The foregoing has described a turbine blade 30 having an internal cooling configuration that includes cooling of the blade platform 40. The cooling configuration uses the same coolant to cool a portion of the airfoil 42, to cool the platform 40, to cool the adjoining nozzle inner bands 28 and 120, and to minimize the ingestion of hot gases into the forward and aft disk wheel spaces 122 and 124. The present invention thus provides a benefit to the turbine cycle efficiency by reducing the total amount of coolant required for cooling the engine 10.

While specific embodiments of the present invention have been described, it will be apparent to those skilled in the art that various modifications thereto can be made without departing from the spirit and scope of the invention as defined in the appended claims.

What is claimed is:

1. A turbine blade comprising:
   a platform having an internal cavity formed therein;
   an airfoil extending radially from said platform;
   an internal cooling circuit formed in said airfoil for circulating a coolant therethrough, said internal cooling circuit including a plurality of radially extending cavities fluidly connected in series in a serpentine arrangement with two of said radially extending cavities being connected at a turn; and
   at least one supply passage extending between said turn and said internal cavity.

2. The turbine blade of claim 1 further comprising a second supply passage extending between said internal cooling circuit and said internal cavity.

3. The turbine blade of claim 1 further comprising a plurality of holes formed in said platform so as to provide egress for coolant from said internal cavity.

4. The turbine blade of claim 3 wherein said platform includes a forward angel wing and an aft angel wing, said plurality of holes including a first group of outlet holes formed in said forward angel wing and a second group of outlet holes formed in said aft angel wing.

5. The turbine blade of claim 3 wherein said platform includes a radially outer surface, said plurality of holes including film cooling holes formed in said radially outer surface.

6. The turbine blade of claim 1 further comprising a plurality of convective cooling enhancement features disposed in said internal cavity.

7. The turbine blade of claim 6 wherein said convective cooling enhancement features comprise pins extending from a radially outer wall of said platform to a radially inner wall of said platform.

8. A turbine blade for use in a gas turbine engine having a turbine rotor disk, said turbine blade comprising:
   a dovetail for mounting said turbine blade to said rotor disk;

a shank extending from said dovetail;

a platform joined to said shank and having an internal cavity formed therein;

an airfoil extending radially from said platform;

an internal cooling circuit formed in said airfoil for circulating a coolant therethrough, said internal cooling circuit including a plurality of radially extending cavities fluidly connected in series in a serpentine arrangement with two of said radially extending cavities being connected at a turn; and at least one supply passage extending between said turn and said internal cavity.

9. The turbine blade of claim 8 further comprising a second supply passage extending between said internal cooling circuit and said internal cavity.

10. The turbine blade of claim 8 further comprising a plurality of holes formed in said platform so as to provide egress for coolant from said internal cavity.

11. The turbine blade of claim 10 wherein said platform includes a forward angel wing and an aft angel wing, said plurality of holes including a first group of outlet holes formed in said forward angel wing and a second group of outlet holes formed in said aft angel wing.

12. The turbine blade of claim 11 wherein said outlet holes are angled away from the direction of rotation of said rotor disk.

13. The turbine blade of claim 10 wherein said platform includes a radially outer surface, said plurality of holes including film cooling holes formed in said radially outer surface.

14. The turbine blade of claim 8 further comprising a plurality of convective cooling enhancement features disposed in said internal cavity.

15. The turbine blade of claim 14 wherein said convective cooling enhancement features comprise pins extending from a radially outer wall of said platform to a radially inner wall of said platform.

16. In a gas turbine engine having a turbine rotor including at least one blade mounted to a rotor disk, said blade having a platform and an airfoil extending radially from said platform, a method of cooling said blade comprising the steps of:

providing said airfoil with an internal cooling circuit having a plurality of radially extending cavities fluidly connected in series in a serpentine arrangement with two of said radially extending cavities being connected at a turn;

providing said platform with an internal cavity;

introducing coolant into said internal cooling circuit; and diverting a portion of the coolant from said turn to said internal cavity.

17. The method of claim 16 wherein said coolant is expelled from said internal cavity in a series of jets that impinge on adjacent structure.

18. The method of claim 16 wherein said coolant is expelled from said internal cavity into disk wheel spaces adjacent to said turbine rotor so as to block ingestion of hot gases into said disk wheel spaces.

19. The method of claim 16 wherein said coolant is expelled from said internal cavity into disk wheel spaces adjacent to said turbine rotor so as to purge said disk wheel spaces.

20. The method of claim 16 wherein said coolant is expelled from said internal cavity via film cooling holes formed in said platform.

* * * * *